(12) United States Patent
Chen

(10) Patent No.: US 10,733,923 B2
(45) Date of Patent: Aug. 4, 2020

(54) DISPLAY PANEL TEST DETECTION METHOD AND DEVICE FOR STORING A PICTURE FOR DETECTION IN A SOURCE DRIVER CIRCUIT BOARD

(71) Applicants: HKC Corporation Limited, Shenzhen (CN); Chongqing HKC Optoelectronics Technology Co., Ltd., Chongqing (CN)

(72) Inventor: Wei Chen, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

(*) Notice: Subject to any disclaimer, the term of this patent is extended or adjusted under 35 U.S.C. 154(b) by 0 days.

(21) Appl. No.: 16/329,233

(22) PCT Filed: May 10, 2017

(86) PCT No.: PCT/CN2017/083791
§ 371 (c)(1),
(2) Date: Feb. 28, 2019

(87) PCT Pub. No.: WO2018/107649
PCT Pub. Date: Jun. 21, 2018

(65) Prior Publication Data
US 2019/0251885 A1      Aug. 15, 2019

(30) Foreign Application Priority Data

Dec. 16, 2016   (CN) ........................ 2016 1 1182537

(51) Int. Cl.
*G09G 3/00*      (2006.01)
*G09G 3/20*      (2006.01)
(Continued)

(52) U.S. Cl.
CPC ............ *G09G 3/006* (2013.01); *G06T 7/001* (2013.01); *G09G 3/20* (2013.01); *H04N 17/004* (2013.01);
(Continued)

(58) Field of Classification Search
CPC ........ G09G 3/006; G09G 3/20; G09G 3/3688; G09G 2330/04; G09G 2330/12;
(Continued)

(56) References Cited

U.S. PATENT DOCUMENTS 6,275,061 B1 * 8/2001 Tomita .................. G09G 3/006
                                                                 324/760.02
RE37,847 E * 9/2002 Henley ................ G01R 31/316
                                                                     345/87
(Continued)

FOREIGN PATENT DOCUMENTS

CN   1645463   A   7/2005
CN   102063877 A   5/2011
(Continued)

OTHER PUBLICATIONS

Shaowei Wang, the ISA written comments, Sep. 2017, CN.
Shaowei Wang, the International Searching Report dated Sep. 2017, CN.

*Primary Examiner* — Darlene M Ritchie

(57) ABSTRACT

The present application discloses a detection method for a display panel and a detection apparatus for a display panel. The detection method includes the following steps: storing a picture for detection in a source driver circuit board of a display panel; electrically connecting a power source board generating a power source signal directly to the source driver circuit board.

13 Claims, 8 Drawing Sheets

(51) Int. Cl.
*G09G 3/36* (2006.01)
*H04N 17/00* (2006.01)
*G06T 7/00* (2017.01)

(52) U.S. Cl.
CPC .. *G06T 2207/30121* (2013.01); *G09G 3/3688* (2013.01); *G09G 2300/0439* (2013.01); *G09G 2310/08* (2013.01); *G09G 2330/04* (2013.01); *G09G 2330/12* (2013.01)

(58) Field of Classification Search
CPC ....... G09G 2310/08; G09G 2300/0439; H04N 17/02; H04N 17/004; G06T 7/001; G06T 7/0004; G06T 7/0002; G06T 7/0014; G06T 2207/30121; G06T 2207/30168; G02F 1/136204
See application file for complete search history.

(56) References Cited

U.S. PATENT DOCUMENTS

| | | | | |
|---|---|---|---|---|
| 6,633,135 | B2* | 10/2003 | Nara | G09G 3/006 315/169.1 |
| 7,750,661 | B2* | 7/2010 | Hsu | G09G 3/006 324/760.01 |
| 2002/0084972 | A1 | 7/2002 | Kim | |
| 2006/0066800 | A1* | 3/2006 | Furukoshi | G02F 1/13452 349/151 |
| 2007/0120788 | A1* | 5/2007 | Tsai | G09G 3/3611 345/87 |
| 2007/0126667 | A1* | 6/2007 | Nakamura | G09G 3/3233 345/76 |
| 2009/0207106 | A1* | 8/2009 | Mizukoshi | G09G 3/3233 345/76 |
| 2010/0011249 | A1* | 1/2010 | Kim | G06F 11/2221 714/30 |
| 2011/0063455 | A1* | 3/2011 | Krancher | H04N 17/02 348/180 |
| 2011/0169792 | A1* | 7/2011 | Shimizu | G02F 1/1309 345/204 |
| 2014/0049533 | A1* | 2/2014 | Saitoh | G09G 3/20 345/213 |
| 2014/0125645 | A1* | 5/2014 | Ghaderi | G09G 3/006 345/211 |
| 2014/0146231 | A1* | 5/2014 | Lin | G06F 3/1454 348/554 |
| 2015/0109348 | A1* | 4/2015 | Hikichi | G09G 3/20 345/690 |
| 2016/0035308 | A1* | 2/2016 | Ota | G09G 3/3688 345/211 |
| 2016/0104456 | A1* | 4/2016 | Tsai | G09G 3/3648 345/213 |
| 2016/0247436 | A1* | 8/2016 | Lee | G09G 3/2003 |
| 2016/0365071 | A1* | 12/2016 | Lim | G09G 5/18 |
| 2017/0345352 | A1* | 11/2017 | Hemminki | G09G 3/006 |
| 2018/0005556 | A1* | 1/2018 | Xu | G09G 3/006 |
| 2018/0018910 | A1* | 1/2018 | Jang | G09G 3/006 |
| 2018/0277030 | A1* | 9/2018 | Wang | G09G 3/2092 |

FOREIGN PATENT DOCUMENTS

| | | |
|---|---|---|
| CN | 202084281 U | 12/2011 |
| CN | 102629457 A | 8/2012 |
| CN | 204302618 U | 4/2015 |
| CN | 204904802 U | 12/2015 |
| CN | 105575346 A | 5/2016 |
| CN | 105869591 A | 8/2016 |
| CN | 106228923 A | 12/2016 |
| CN | 106504687 A | 3/2017 |

* cited by examiner

DISPLAY PANEL TEST DETECTION METHOD AND DEVICE FOR STORING A PICTURE FOR DETECTION IN A SOURCE DRIVER CIRCUIT BOARD

This application claims priority to Chinese Patent Application No. CN201611182537X, filed with the Chinese Patent Office on Dec. 16, 2016, and entitled "DETECTION METHOD FOR DISPLAY PANEL AND DETECTION APPARATUS FOR DISPLAY PANEL", which is incorporated herein by reference in its entirety.

TECHNICAL FIELD

The present application relates to the technical field of displays, and particularly to a detection method for a display panel and a detection apparatus for a display panel.

BACKGROUND

The statements herein merely provide background information related to the present application and do not necessarily constitute prior art.

Liquid crystal display apparatuses have numerous advantages, such as a thin body, power savings, no radiation, and are widely used. Most liquid crystal display apparatuses in the current market are backlit liquid crystal display apparatuses, each including a liquid crystal panel and a backlight module. Working principle of the liquid crystal panel is that liquid crystals are put in two parallel glass substrates, and a driving voltage is applied to two glass substrates to control rotation of the liquid crystals, to refract light rays of the backlight module to generate a picture.

Thin film transistor-liquid crystal display apparatuses (TFT-LCD apparatuses) currently maintain a leading status in the display field because of low power consumption, excellent picture quality, high production yield, and other properties. Similarly, the thin film transistor-liquid crystal display apparatus includes a liquid crystal panel and a backlight module. The liquid crystal panel includes a color filter substrate (CF substrate) and a thin film transistor substrate (TFT substrate), and transparent electrodes on relative inner sides of the above substrates. A layer of liquid crystals (LC) is positioned between two substrates. The liquid crystal panel changes a polarized state of light by controlling the direction of the LCs through an electric field, for penetration and obstruction of a light path via a polarized plate to display.

A manufacturing process of a liquid crystal display open cell (LCD open cell) is divided into a former manufacturing process, an intermediate manufacturing process and a later manufacturing process, and the former manufacturing, process is mainly adapted to manufacturing thin film transistor (TFT) glass; the intermediate manufacturing process is mainly adapted to fit the TFT glass to a color filter layer and add upper and lower polarizers; and the later manufacturing process is adapted to press-fit a driver integrated circuit (IC) to the TFT glass and complete the open cell. In the later manufacturing process, after bonding is performed on a production line, there is a need to perform a high temperature and high humidity test to guarantee the resistance thereof.

When the high temperature and high humidity test are performed on the open cell, a plurality of external test circuit boards is required to provide a picture and a clock signal. The external test circuit boards have poor high temperature and high humidity resistance, and the external test circuit boards are easily damaged in repeated high temperature and high humidity tests.

SUMMARY

The present application provides a detection method for a display panel and a detection apparatus for a display panel to prevent a plurality of external test circuit boards from being damaged.

The aim of the present application is achieved by the following methods.

According to one aspect of the present application, the present application discloses a detection method for a display panel, the detection method including the following steps:

storing a picture for detection in a source driver circuit board of a display panel;

electrically connecting a power source board generating a power source signal directly to the source driver circuit board; and transmitting the power source signal and a clock signal to the source driver circuit board.

Optionally, the clock signal is directly generated by the power source board.

Optionally, the power source board is connected to a first connector of the source driver circuit board by a first connecting line, and the power source board is connected to a second connector of the source driver circuit board by a second connecting line; the power source signal is transmitted to the first connector through the first connecting line, and the clock signal is transmitted to the second connector through the second connecting line; and a source driver chip of the source driver circuit board is connected to the first connector and the second connector respectively by a connecting strip.

Optionally, the clock signal is directly generated by the source driver circuit board.

Optionally, the clock signal is directly generated by the source driver chip of the source driver circuit board.

Optionally, the power source board is connected to a third connector of the source driver circuit board by a third connecting line, and the power source signal is transmitted to the third connector through the third connecting line; and the source driver chip is connected to the third connector by the connecting strip.

Optionally, the picture is stored in the source driver chip of the source driver circuit board.

According to another aspect of the present application, the present application further discloses a detection apparatus for a display panel, the detection apparatus for a display panel including: a picture storage apparatus adapted to store a picture for detection and stored in a source driver circuit board of the display panel; a power source board adapted to generate a power source signal and electrically connected to the source driver circuit board directly; and a clock signal generation circuit adapted to generate a clock signal and electrically connected to the source driver circuit board.

Optionally, the clock signal generation circuit is disposed on the power source board.

Optionally, the clock signal generation circuit including an oscillator, the oscillator is disposed on the power board.

Optionally, the power source board is connected to a first connector of the source driver circuit board by a first connecting line, and the power source board is connected to a second connector of the source driver circuit board by a second connecting line; the power source signal is transmitted to the first connector through the first connecting line, and the clock signal is transmitted to the second connector through the second connecting line; and the source driver chip of the source driver circuit board is connected to the first connector and the second connector respectively by the connecting strip.

Optionally, the clock signal generation circuit is generated on the source driver chip of the source driver circuit board.

Optionally, the power source board is connected to a third connector of the source driver circuit board by a third connecting line, and the power source signal is transmitted to the third connector through the third connecting line; and the source driver chip is connected to the third connector by the connecting strip.

Optionally, the picture storage apparatus is stored in the source driver circuit board of the display panel.

Optionally, the power source board is electrically connected to the clock signal generation circuit, the clock signal generation circuit is electrically connected to the connector, the connector is electrically connected to the connector strip, and the connector strip is electrically connected to the source driver chip.

Optionally, the clock signal generation circuit is electrically connected to the power source board, the power source board is connected through the sixth connection line and the sixth connector, and the power board is connected through the seventh connection line and the seventh connection line, the connecting strips are electrically connected to the sixth connector and the seventh connector.

The present application further discloses a detection apparatus for a display panel, the detection apparatus for a display panel including: a picture storage apparatus, a power source board and a clock signal generation circuit, the picture storage apparatus adapted to store a picture for detection and stored in a source driver chip of a source driver circuit board, of the display panel; the power source board adapted to generate a power source signal and electrically connected to the source driver circuit board directly; and the clock signal generation circuit adapted to generate a clock signal, electrically connected to the source driver circuit board and disposed on the power source board. The power source board is connected to a first connector of the source driver circuit board by a first connecting line, and the power source board is connected to a second connector of the source driver circuit board by a second connecting line; the power source sural is transmitted to the first connector through the first connecting line, the clock signal is transmitted to the second connector through the second connecting line; and the source driver chip of the source driver circuit board is connected to the first connector and the second connector respectively by the connecting strip.

When a high temperature and high humidity test is performed on the existing open cell, a plurality of external test circuit boards are required to provide picture and clock signals. However, because of having poor high temperature and high humidity resistance, the external test circuit boards are easily damaged in repeated high temperature and high humidity tests. Compared with the method of using a Timing Controller (TCON), and set TCON on a logic board to provide a picture and a clock signal in the actual test process, and uses a power source board to provide a power source signal, procedures and costs may be reduced as compared with the method of using a plurality of external test circuit boards to provide the picture and the clock signal respectively. However, because of having poor high temperature and high humidity resistance, the logic board may be damaged in repeated high temperature and high humidity tests.

Therefore, the applicant uses the technical solution of the present application. In the present application, the picture for detection is directly stored in the source driver circuit board of the display panel, the power source board is electrically connected to the source driver circuit board directly, and the power source signal and the clock signal are transmitted to the source driver circuit board, so that the display panel may be detected without using a plurality of external test circuit boards or the logic board to provide the picture, to realize high temperature and high humidity detection. Thus, the present application may realize high temperature and high humidity detection without using a plurality of external test circuit boards or the logic board. The plurality of external test circuit boards is omitted, and then the plurality of external test circuit boards is prevented from being damaged, thereby not only saving equipment investment costs and maintenance costs in the detection process, but also omitting a procedure in the detection process, and improving the production efficiency.

BRIEF DESCRIPTION OF DRAWINGS

The drawings included are used for providing further understanding of embodiments of the present application, constitute part of the description, are used for illustrating implementation manners of the present application, and interpret principles of the present application together with text description. Apparently, the drawings in the following description are merely some embodiments of the present application, and for those of ordinary skill in the art, other drawings can also be obtained according to the drawings without contributing creative labor. In the drawings.

DETAILED DESCRIPTION

Figure 1:
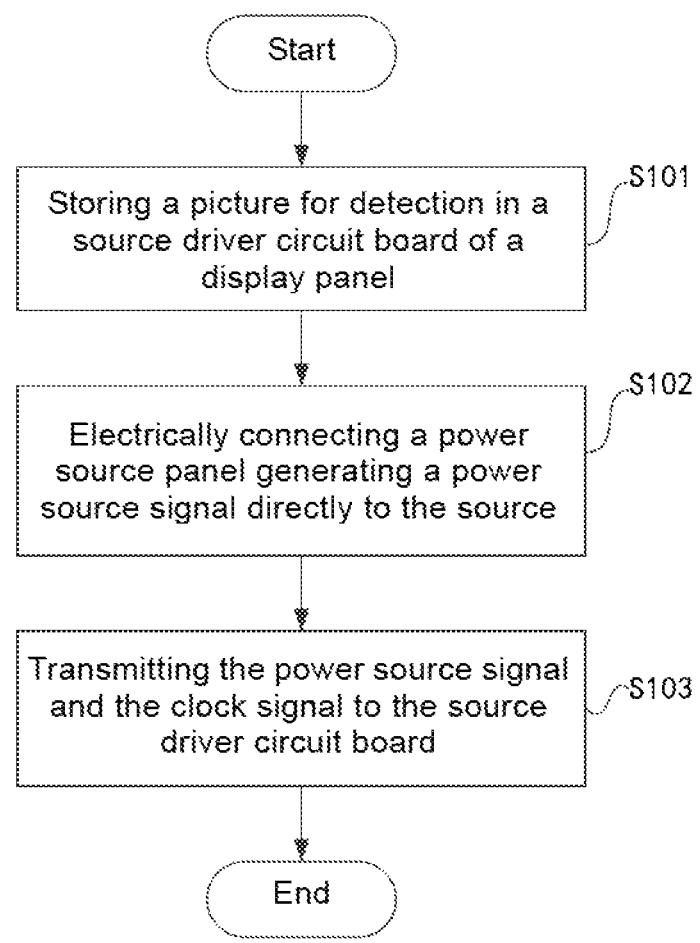
FIG. 1 is a flowchart of a detection method for a display panel in an embodiment of the present application.

Specific structure and function details disclosed herein are only representative and are used for the purpose of describing exemplary embodiments of the present application. However, the present application may be specifically achieved in many alternative forms and shall not be interpreted to be only limited to the embodiments described herein.

It should be understood in the description of the present application that terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present application and the simplification of the description rather than to indicate or imply that the indicated apparatus or element must have a specific direction or constructed and operated in a specific direction, and therefore, shall not be understood as a limitation to the present application. In addition, the terms such as "first" and "second" are only used for the purpose of description, rather than being understood to indicate or imply relative importance or hint the number of indicated technical features. Thus, the feature limited by "first" and "second" can explicitly or impliedly comprise one or more features. In the description of the present application, the meaning of "a plurality of" is two or more unless otherwise specified. In addition, the term "comprise" and any variant are intended to cover non-exclusive inclusion.

It should be noted in the description of the present application that, unless otherwise specifically regulated and defined, terms such as "installation", "bonded" and "bonding" shall be understood in broad sense, and for example, may refer to fixed bonding or detachable bonding or integral bonding, may refer to mechanical bonding or electrical bonding, and may refer to direct bonding or indirect bonding through an intermediate medium or inner communication of two elements. For those of ordinary skill in the art, the meanings of the above terms in the present application may be understood according to concrete conditions.

The terms used herein are intended to merely describe concrete embodiments, not to limit the exemplary embodiments. Unless otherwise noted clearly in the context, singular forms "one" and "single" used herein are also intended to comprise plurals. It should also be understood that the terms "comprise" and/or "include" used herein specify the existence of stated features, integers, steps, operation, units and/or assemblies, not excluding the existence or addition of one or more other features, integers, steps, operation, units, assemblies and/or combinations of these.

The detection method for the display panel and the display apparatus for the display panel in embodiments of the present application are described below with reference to FIG. 1 to FIG. 8.

The present application will be further described in detail below in combination with FIG. 1 to FIG. 8 and specific embodiments.

In one or more embodiments, as shown in FIG. 1, FIG. 1 is a flowchart of a detection method for a display panel. The detection method includes the following steps: step S101, step S102, and step S103. Specifically:

Step S101: storing a picture for detection in a source driver circuit board of a display panel;

Step S102: electrically connecting a power source board generating a power source signal directly to the source driver circuit board; and Step S103: transmitting the power source signal and the clock signal to the source driver circuit board.

In the present application, the picture for detection is directly stored in the source driver circuit board of the display panel, the power source board is electrically connected to the source driver circuit board directly, and the power source signal and the clock signal are transmitted to the source driver circuit board, so that the display panel may be detected without using a plurality of external test circuit boards or the logic board to provide the picture, to realize high temperature and high humidity detection. Thus, the present application can realize high temperature and high humidity detection without using a plurality of external test circuit boards or the logic board. The plurality of external test circuit boards is omitted, and then the plurality of external test circuit boards is prevented from being damaged, thereby not only saving equipment investment costs and maintenance costs in the detection process, but also omitting a procedure in the detection process, and improving the production efficiency.

The source driver circuit board includes a source driver chip. In Step S101, specifically, the picture is stored in the source driver chip, to be used for high temperature and high humidity detection.

The picture includes but not limited to: a red picture, a green picture, a blue picture, a black picture and a grey picture.

In step S102, the power source board is electrically connected to the source driver circuit board directly. Specifically, the power source board is electrically connected to a connector of the source driver circuit board by a connecting line (for example, conducting line), the connector is connected to a connecting strip, and the connecting strip is connected to the source driver chip. Therefore, the power source signal of the power source board is transmitted to the connector through the connecting line, and the signal is transmitted to the connecting strip by the connector and then is transmitted to the source driver chip by the connecting strip, to be used for high temperature and high humidity detection.

In step S103, the power source signal and the clock signal are transmitted to the source driver circuit board. Specifically, the power source signal and the clock signal are transmitted to the source driver chip of the source driver circuit board, so that high temperature and high humidity detection may be completed.

Figure 2:
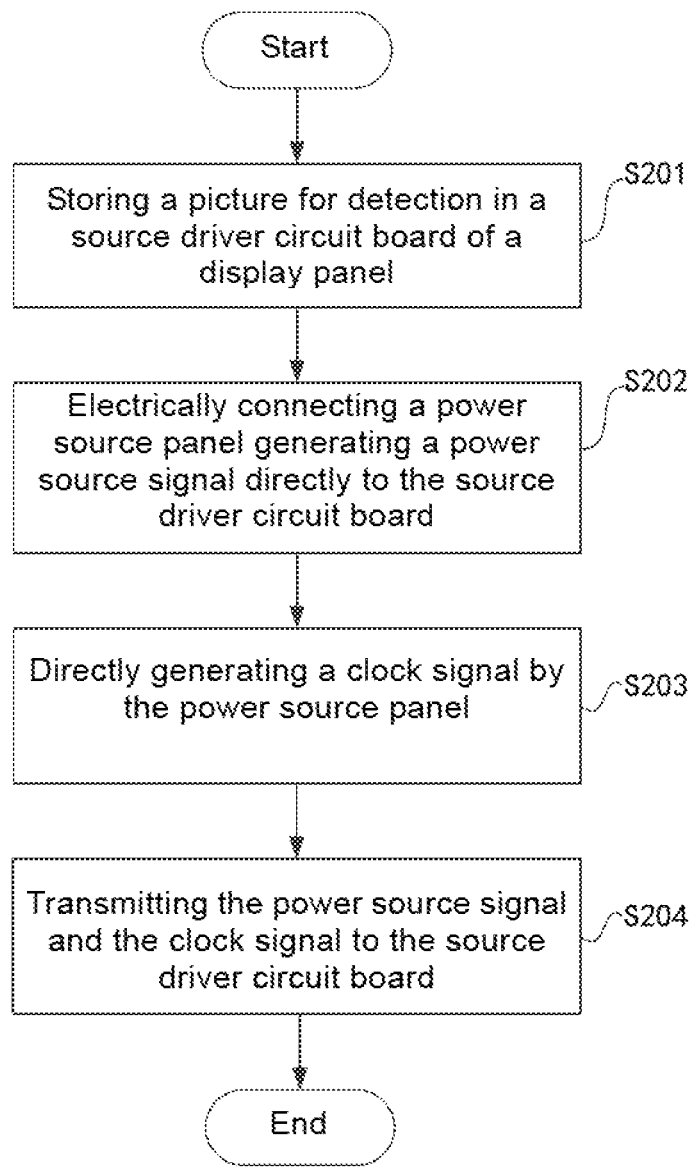
FIG. 2 is a flowchart of a detection method for a display panel in an embodiment of the present application.

In one of mere embodiments, as shown in FIG. 2, FIG. 2 is a specific flowchart of a detection method for a display panel. The detection method shown in FIG. 2 includes step S201, step S202, step S203, and step S204. Specifically:

Step S201: storing a picture for detection in a source driver circuit board of a display panel;

Step S202: electrically connecting a power source board generating a power source signal directly to the source driver circuit board;

Step S203: directly generating a clock signal by the power source panel; and

Step S204: transmitting the power source signal and the clock signal to the source driver circuit board.

Step S201 is identical to step S101 in FIG. 1, see step S101 in FIG. 1 for detail. Step S202 is identical to step S102 in FIG. 1, see step S102 in FIG. 1 for detail. Step S201 and step S202 will not be described in detail herein.

In step S203, the clock signal is directly generated by the power source board. This is a specific manner of transmitting a clock signal of the present application. The part generating the clock signal is integrated onto the power source board. In the present embodiment, an oscillator may be integrated onto the power source board, to generate the clock signal by the oscillator. Of course, it should be noted that in the present embodiment, other structures may be integrated onto the power source board as well, to generate the clock signal. Thus, the power source board may directly generate the clock signal. In this way, the power source board can not only transmit the power source signal to the source driver circuit board, but also can transmit the clock signal to the source driver circuit board. Therefore, in the detection process, the power source board is only electrically connected to the source driver circuit board without being additionally connected to a logic board or other circuit part. In this way, an assembling procedure is further omitted, and the detection efficiency is further improved. Moreover, because of having excellent high temperature and high humidity resistance, the power source board is not easily damaged in a high temperature and high humidity resistance test.

Specifically, the power source board is connected to a first connector of the source driver circuit board by a first connecting line, and the power source board is connected to a second connector of the source driver circuit board by a second connecting line; the power source signal is transmitted to the first connector through the first connecting line, and the clock signal is transmitted to the second connector through the second connecting line; and a source driver chip of the source driver circuit board is connected to the first connector and the second connector respectively by a connecting strip. The power source board is electrically connected to the two connectors (first connector and second connector) by the connecting lines (first connecting line second connecting line) respectively, and the power source signal and the clock signal to are transmitted respectively, thereby guaranteeing that various signals may be normally transmitted.

In step S204, the first connecting line is connected to the first connector, the first connector is connected to the connecting strip, and the connecting strip is connected to the source driver chip. Therefore, the power source signal of the power source board is transmitted to the source driver chip through the first connecting line, the first connector and the connecting strip in sequence to be used for high temperature and high humidity detection. The second connecting line is connected to the second connector, the second connector is connected to the connecting strip, and the connecting strip is connected to the source driver chip. Therefore, the clock signal of the power source board is transmitted to the source driver chip through the second connecting line, the second connector and the connecting strip in sequence to be used for high temperature and high humidity detection.

In the present embodiment, a logic board or a plurality of other detection circuit boards are omitted, and the logic board or the plurality of other detection circuit boards are prevented from being damaged, thereby not only saving costs, but also omitting a procedure, and further improving the detection efficiency.

In one or more embodiments, the clock signal is directly generated by the source driver circuit board. The source driver circuit board includes a source driver chip, a connecting strip and a connector. A clock signal may be generated by the source driver chip, the connecting strip or the connector. There is no need to additionally connect the power source board to a logic board or other detection circuit part. In this way, an assembling procedure is further omitted, and the detection efficiency is further improved.

Figure 3:
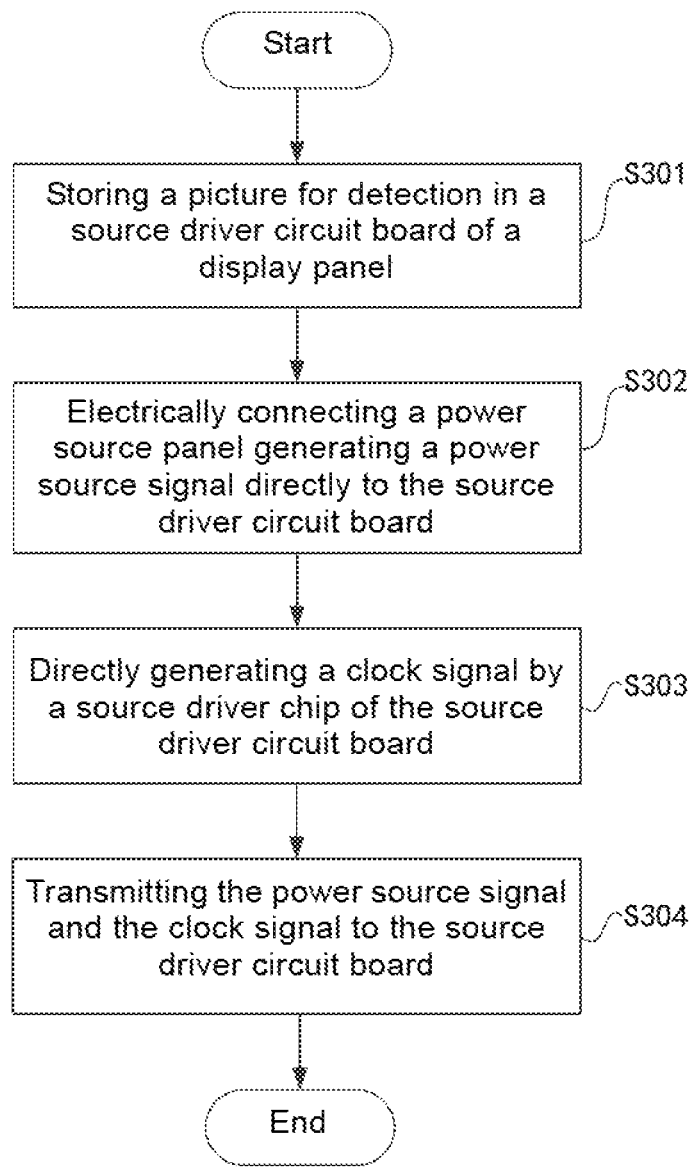
FIG. 3 is a flowchart of a detection method for a display panel in an embodiment of the present application.

Specifically, as shown in FIG. 3, FIG. 3 is another specific flowchart of a detection method for a display panel. The detection method shown in FIG. 3 includes step S301, step S302, step S303, and step S304. Specifically:

Step S301: storing a picture for detection in a source driver circuit board of a display panel;

Step S302: electrically connecting a power source board generating a power source signal directly to the source driver circuit board;

Step S303: directly generating a clock signal by a source driver chip of the source driver circuit board; and Step S304: transmitting the power source signal and the clock signal to the source driver circuit board.

Step S301 is identical to step S101 in FIG. 1, see step S101 in FIG. 1 for detail. Step S302 is identical to step S102 in FIG. 1, see step S102 in FIG. 1 for detail. Step S301 and step S302 will not be described in detail herein.

In step S303, the clock signal is directly generated by the source driver chip of the source driver circuit board. This is another specific manner of transmitting the clock signal in an embodiment of the present application. The part generating the clock signal is integrated onto the source driver chip of the source driver circuit board. In the present embodiment, an oscillator may be integrated onto the power source board, to generate the clock signal by the oscillator. Of course, it should be noted that in the present embodiment, other structures may be integrated onto the source driver chip as well, to generate the clock signal. In this way, the source driver chip may directly generate a clock signal and transmit same. Therefore, in the detection process, the power source signal of the power source board is only transmitted to the source driver circuit board without additionally connecting the power source board to a logic board or other circuit part. In this way, an assembling procedure is further omitted, and the detection efficiency is further improved.

Specifically, the power source board is connected to a third connector of the source driver circuit board by a third connecting line, and the power source signal is transmitted to the third connector through the third connecting line; and the source driver chip is connected to the third connector by the connecting strip. The power source board is directly connected to the third connector by the third connecting line to transmit the power source signal, and the connecting mode thereof is simple and convenient without additionally connecting the power source board to other circuit part, thereby facilitating the operation of staff.

In step S304 the third connecting line is connected to the third connector, the third connector is connected to the connecting strip, and the connecting strip is connected to the source driver chip. Therefore, the power source signal of the power source board is transmitted to the source driver chip through the third connecting line, the third connector and the connecting strip in sequence. The source driver chip may directly generate the clock signal to perform high temperature and high humidity detection.

In the present embodiment, the present embodiment has the advantages that a logic board or other detection circuit boards are omitted, and the logic board or the other detection circuit boards are prevented from being damaged, thereby not only saving costs, but also omitting a procedure, and improving the detection efficiency.

Figure 4:
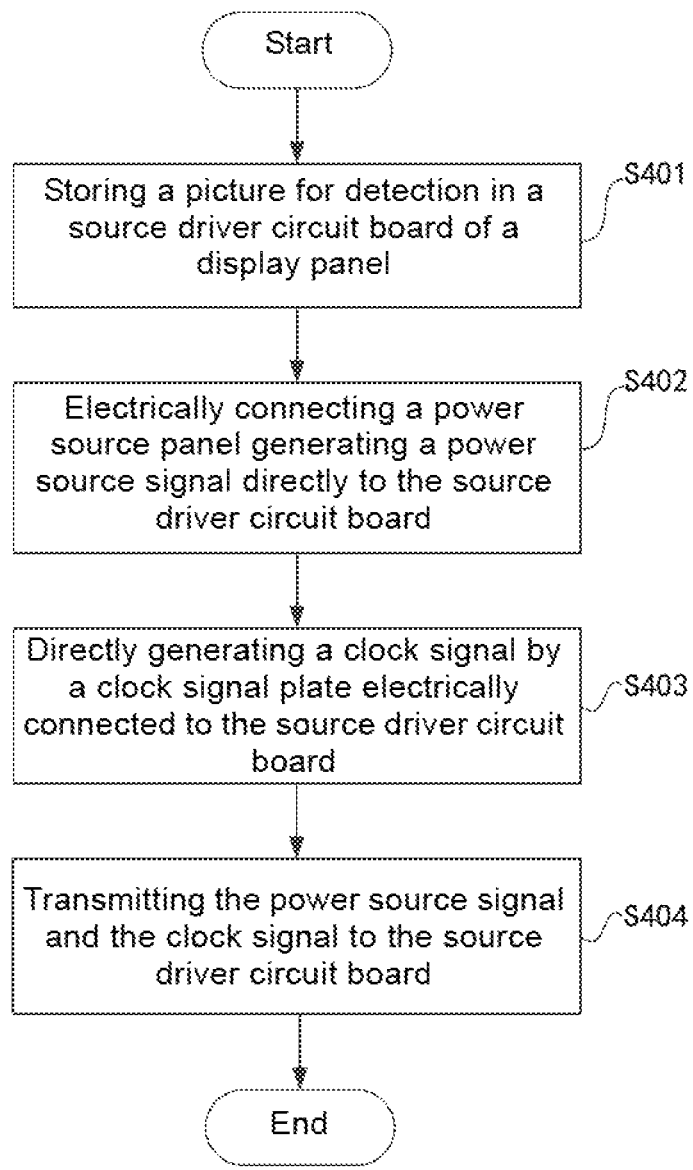
FIG. 4 is a flowchart of a detection method for a display panel in an embodiment of the present application.

In one or more embodiments, as shown in FIG. 4, FIG. 4 is another specific flowchart of a detection method for a display panel. The detection method shown in FIG. 4 includes step S401, step S402, step S403, and step S404. Specifically:

Step S401: storing a picture for detection in a source driver circuit board of a display panel;

Step S402: electrically connecting a power source board generating a power source signal directly to the source driver circuit board;

Step S403: directly generating a clock signal by a clock signal board electrically connected to the source driver circuit board; and Step S404: transmitting the power source signal and the clock signal to the source driver circuit board.

Step S401 is identical to step S101 in FIG. 1, see step S101 in FIG. 1 for detail. Step S402 is identical to step S102 in FIG. 1, see step S102 in FIG. 1 for detail. Step S401 and step S402 will not be described in detail herein.

In step S403, the clock signal is directly generated by a clock signal board which is electrically connected to the source driver circuit board. This is another specific manner of transmitting a clock signal of the present application. The clock signal board generating the clock signal is electrically connected to the source driver circuit board. The clock signal board may transmit the clock signal to the source driver circuit board. Because the logic board and a plurality of other detection circuit boards have high costs, an embodiment of the present application saves costs by replacing the logic board or the plurality of other detection circuit boards with a clock signal board.

An oscillator may be integrated onto the power source board in the present embodiment, to generate the clock signal by the oscillator. Of course, it should be noted that in the present embodiment, other structures may be integrated onto the power source board as well, to generate the clock signal.

The clock signal board in the present embodiment is connected to the connector of the source driver circuit board directly, the connector is connected to the connecting strip of the source driver circuit board, and the connecting strip is connected to the source driver chip of the source driver circuit board. However, it should be noted that in the present embodiment, the clock signal board may be electrically connected to the power source board first, then the power source board is connected to the two connectors by the two connecting lines, the two connectors are connected to the connecting strip, and the connecting strip is connected to the source driver chip.

In step S404, when the clock signal board is connected to the connector directly, the clock signal is transmitted to the source driver chip through the connector and the connecting strip in sequence; and the power source signal is transmitted to the source driver chip through the connecting line, the other connector and the connecting strip, to perform high temperature and high humidity detection.

When the clock signal board is connected to the power source board, the power source board is connected to the two connectors by the two connecting lines respectively the two connectors are connected to the connecting strip, and the connecting strip is connected to the source driver chip. The clock signal is transmitted to the source driver chip through one connecting line, one connector and the connecting strip; and the power source signal is transmitted to the source driver chip through the other connecting line, the other connector and the connecting strip, to perform high temperature and high humidity detection.

Figure 5:
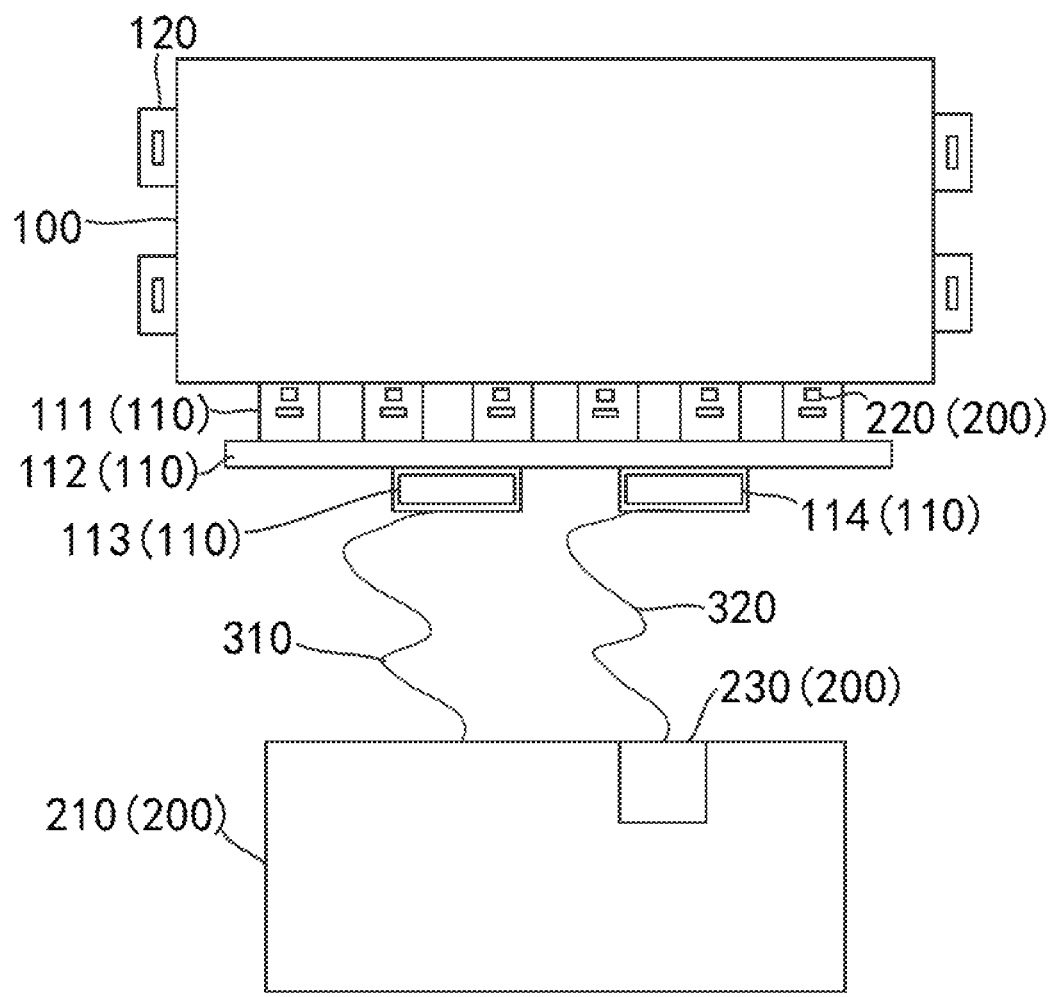
FIG. 5 is a structural schematic diagram of a detection apparatus for a display panel matching the display panel in an embodiment of the present application.

In one of more embodiments, as shown in FIG. 5, FIG. 5 is a structural schematic diagram of a detection apparatus for a display panel matching the display panel. The detection apparatus 200 for a display panel includes a picture storage apparatus 220, a power source board 210 and a clock signal generation circuit 230. The picture storage apparatus 220 is adapted to store a picture for detection, and the picture storage apparatus 220 is stored in the source driver circuit board 110 of the display panel 100; the power source board 210 is adapted to generate a power source signal, and the power source board 210 is electrically connected to the source driver circuit board 110 directly; and the clock signal generation circuit 230 is adapted to generate a clock signal, and the clock signal generation circuit 230 is electrically connected to the source driver circuit board 110. The source driver circuit board 110 includes a source driver chip 111, a connecting strip 112, a first connector 113 and a second connector 114.

Specifically, the picture storage apparatus 220 is stored in the source driver chip 111 without using a logic board to provide the picture, to be used for high temperature and high humidity detection.

The picture includes but not limited to: a red picture, a green picture, a blue picture, a black picture, and a grey picture.

The clock signal generation circuit 230 is disposed on the power source board 210, the power source board 210 is connected to the first connector 113 of the source driver circuit board by a first connecting line 310, the power source board 210 is connected to the second connector 114 of the source driver circuit board by a second connecting line 320, the power source signal is transmitted to the first connector through the first connecting line, and the clock signal is transmitted to the second connector through the second connecting line; and the source driver chip 111 of the source driver circuit board is connected to the first connector 113 and the second connector 114 respectively by the connecting strip 112. This is one specific manner of arranging the clock generation circuit 230 of the present application. The clock signal generation circuit 230 is integrated onto the power source board. The power source board may directly generate the clock signal. In this way, the power source board can not only transmit the power source signal to the source driver circuit board, but also can transmit the clock signal to the source driver circuit board. Therefore, in the detection process, the power source board is only electrically connected to the source driver circuit board without being additionally connected to a logic board or other circuit part. In this way, an assembling procedure is further omitted, and the detection efficiency is further improved. Moreover, because of having excellent high temperature and high humidity resistance, the power source board is not easily damaged in a high temperature and high humidity resistance test. The power source board is electrically connected to the two connectors by the two connecting lines respectively, and the power source signal and the clock signal are transmitted respectively, thereby guaranteeing that various signals may be normally transmitted.

In the present embodiment, an oscillator may be integrated onto the power source board, to generate the clock signal by the oscillator. Of course, it should be noted that in the present embodiment, other structures may be integrated onto the power source board as well, to generate the clock signal.

In the present embodiment, the present embodiment has the advantages that a logic board or other detection circuit boards are omitted, and the logic board or the other detection circuit boards are prevent from being damaged, thereby not only saving costs, but also omitting a procedure, and improving the detection efficiency.

Figure 6:
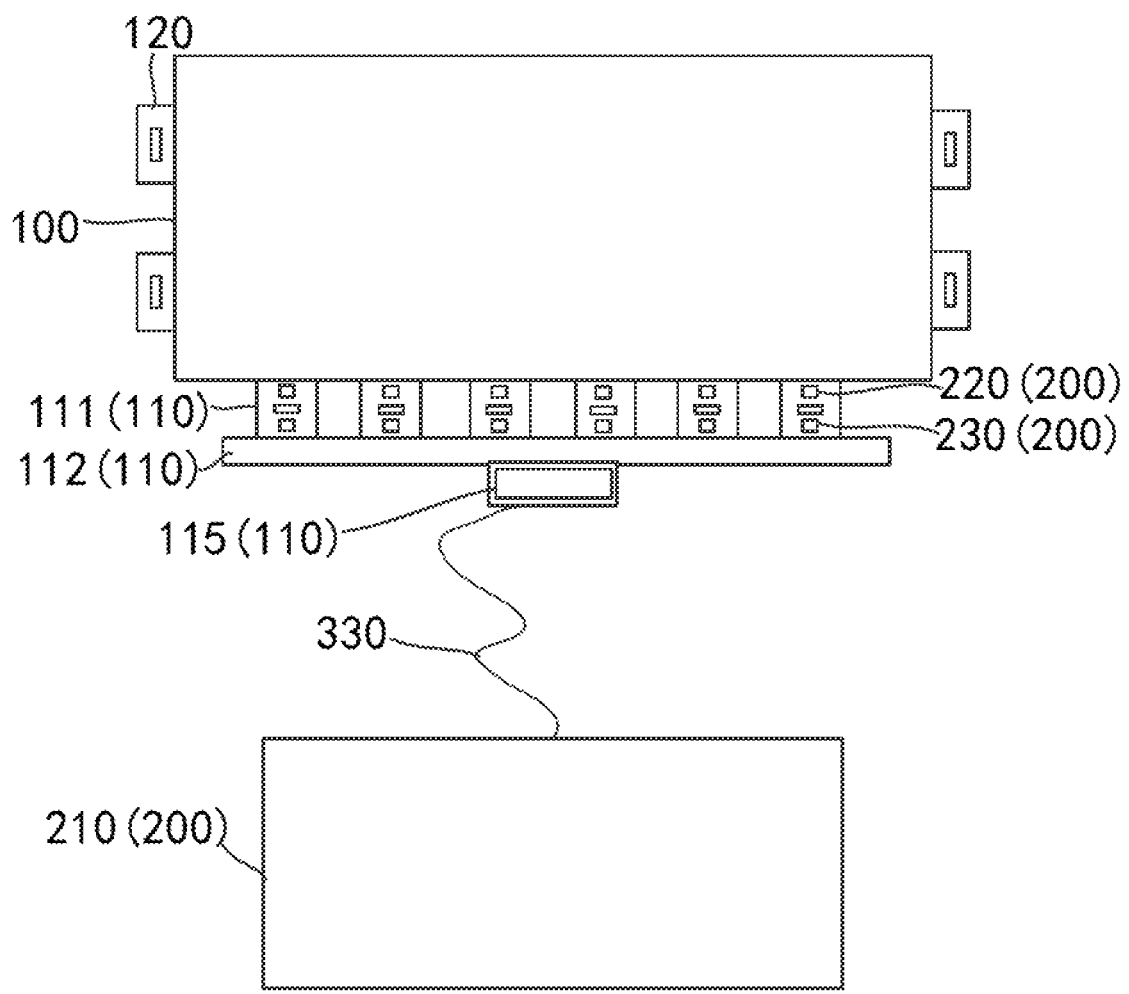
FIG. 6 is a structural schematic diagram of a detection apparatus for a display panel matching the display panel in an embodiment of the present application.

In one or more embodiments, as shown in FIG. 6, FIG. 6 is a structural schematic diagram of a detection apparatus for a display panel matching the display panel. The detection apparatus 200 for a display panel includes a picture storage apparatus 220, a power source board 210 and a clock signal generation circuit 230. The picture storage apparatus 220 is adapted to store a picture for detection, and the picture storage apparatus 220 is stored in the source driver circuit board 110 of the display panel 100; the power source board 210 is adapted to generate a power source signal, and the power source board 210 is electrically connected to the source driver circuit board 110 directly; and the clock signal generation circuit 230 is adapted to generate a clock signal, and the clock signal generation circuit 230 and is electrically connected to the source driver circuit board 110. The source driver circuit board 110 includes a source driver chip 111, a connecting strip 112, and a third connector 115.

Specifically the picture storage apparatus 220 is stored in the source driver chip 111 without using a logic board to provide the picture, to be used for high temperature and high humidity detection.

The picture includes but not limited to: a red picture, a green picture, a blue picture, a black picture and a grey picture.

The clock signal generation circuit 230 is disposed on the source driver circuit board 110, for example, the clock signal generation circuit 230 is disposed on the source driver chip 111, or the clock signal generation circuit 230 is disposed on the connecting strip 112, or the clock signal generation circuit 230 is disposed on the third connector 115.

Specifically, the clock signal generation circuit 230 is disposed on the source driver chip 111 of the source driver circuit board 110, the power source board 210 is connected to the third connector 115 of the source driver circuit board 110 by a third connecting line 330, and the power source signal is transmitted to the third connector 115 through the third connecting line 330; and the source driver chip 111 is connected to the third connector 115 by the connecting strip 112. This is another specific manner of arranging the clock signal generation circuit 230 in an embodiment of the present application. The apparatus generating a clock signal is integrated onto the source driver chip 111 of the source driver circuit board 110. The source driver chip 111 may directly generate the clock signal and transmit same. Therefore, in the detection process, the power source signal of the power source board 210 is only transmitted to the source driver circuit board 110 without additionally connecting the power source board to a logic board or other circuit part. In this way, an assembling procedure is further omitted, and the detection efficiency is further improved. The power source board 210 is directly connected to the third connector 115 by the third connecting line 330 to transmit the power source signal, and the connecting mode thereof is simple and convenient without additionally connecting the power source board to other circuit part, thereby facilitating the operation of staff.

In the present embodiment, an oscillator may be integrated onto the power source board 210, to generate the clock signal by the oscillator. Of course, it should be noted that in the present embodiment, other structures may be integrated onto the source driver circuit board 110 as well, to generate the clock signal.

In the present embodiment, the present embodiment has the advantages that a logic board or other detection circuit boards are omitted, and the logic board or the other detection circuit boards are prevent from being damaged, thereby not only saving costs, but also omitting a procedure, and improving the detection efficiency.

Figure 7:
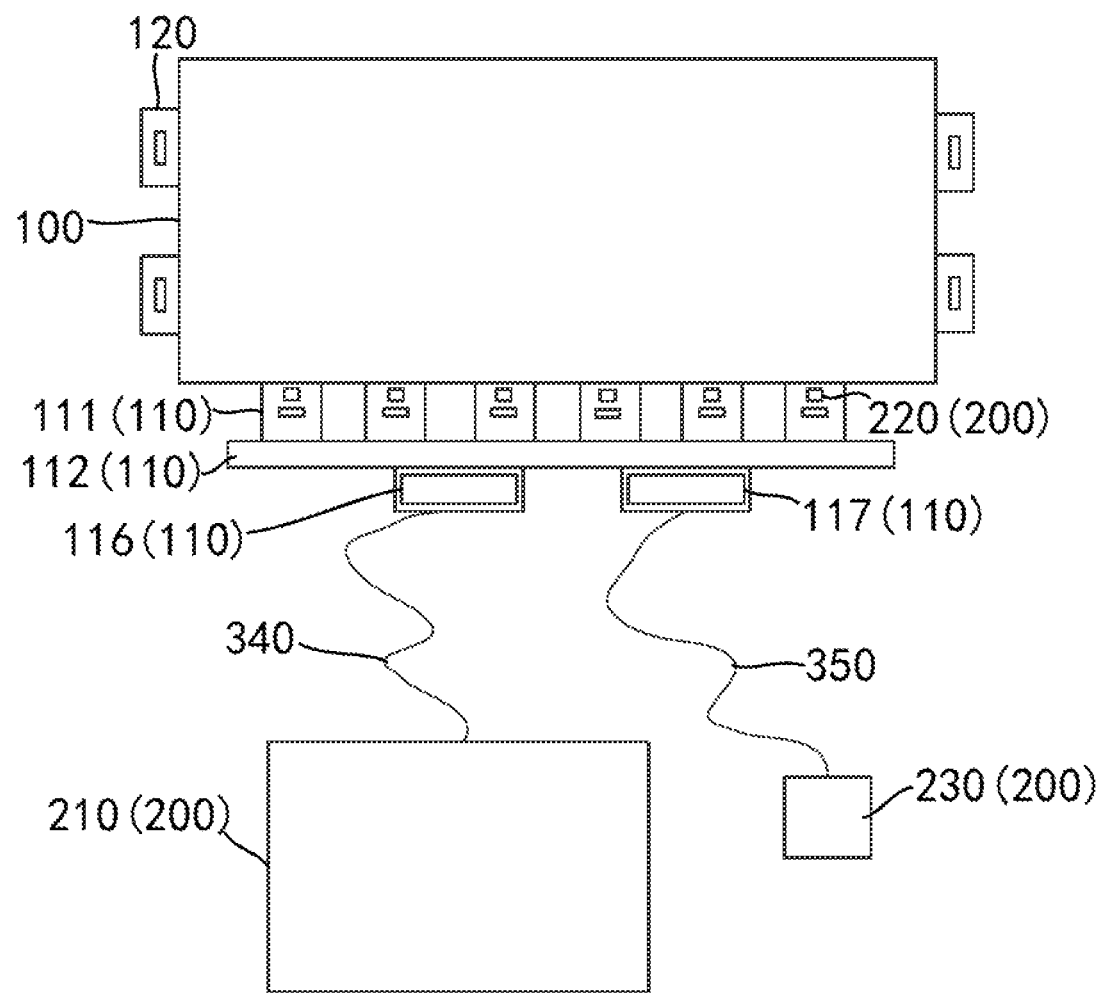
FIG. 7 is a structural schematic diagram of a detection apparatus for a display panel matching the display panel in an embodiment of the present application.

In one or more embodiments, as shown in FIG. 7, FIG. 7 is a structural schematic diagram of a detection apparatus for a display panel matching the display panel. The detection apparatus 200 for a display panel includes a picture storage apparatus 220, a power source board 210, and a clock signal generation circuit 230. The picture storage apparatus 220 is adapted to store a picture for detection, and the picture storage apparatus 220 is stored in the source driver circuit board 110 of the display panel 100; the power source board 210 is adapted to generate a power source signal, and the power source board 210 is electrically connected to the source driver circuit board 110 directly; and the clock signal generation circuit 230 is adapted to generate a clock signal, and the clock signal generation circuit 230 and is electrically connected to the source driver circuit board 110. The source driver circuit board 110 includes a source driver chip 111, a connecting strip 112, a fourth connector 116, and a fifth connector 117.

Specifically, the picture storage apparatus 220 is stored in the source driver chip 111 without using a logic board to provide the picture, to be used for high temperature and high humidity detection.

The picture includes but not limited to: a red picture, a green picture, a blue picture, a black picture, and a grey picture.

The clock signal generation circuit 230 is individually arranged, the clock signal generation circuit 230 may be a clock signal board, or an oscillator may be directly integrated on a circuit board, to generate the clock signal by the oscillator. Of course, it should be noted that in the present embodiment, other structures may be integrated onto the circuit board as well, to generate the clock signal. The clock signal generation circuit 230 in the present embodiment is directly connected to a fifth connector 117 by a fifth connecting line 350, the fifth connector 117 is connected to the connecting strip 112, and the connecting strip 112 is connected to a source driver chip 111. Therefore, the clock signal generated by the clock signal generation circuit 230 is transmitted to the source driver chip 111 through the fifth connecting line 350, the fifth connector 117 and the connecting strip 112. The power source board 210 is connected to a fourth connector 116 by a fourth connecting line 340, the fourth connector 116 is connected to the connecting strip 112, and the connecting strip 112 is connected to the source driver chip 111. Therefore, the power source signal is transmitted to the source driver chip 111 through the fourth connecting line 340, the fourth connector 116 and the connecting strip 112, to perform high temperature and high humidity detection.

However, it should be noted that the clock generation circuit 230 in the present embodiment may not be electrically connected to the source driver circuit board 110 directly.

Figure 8:
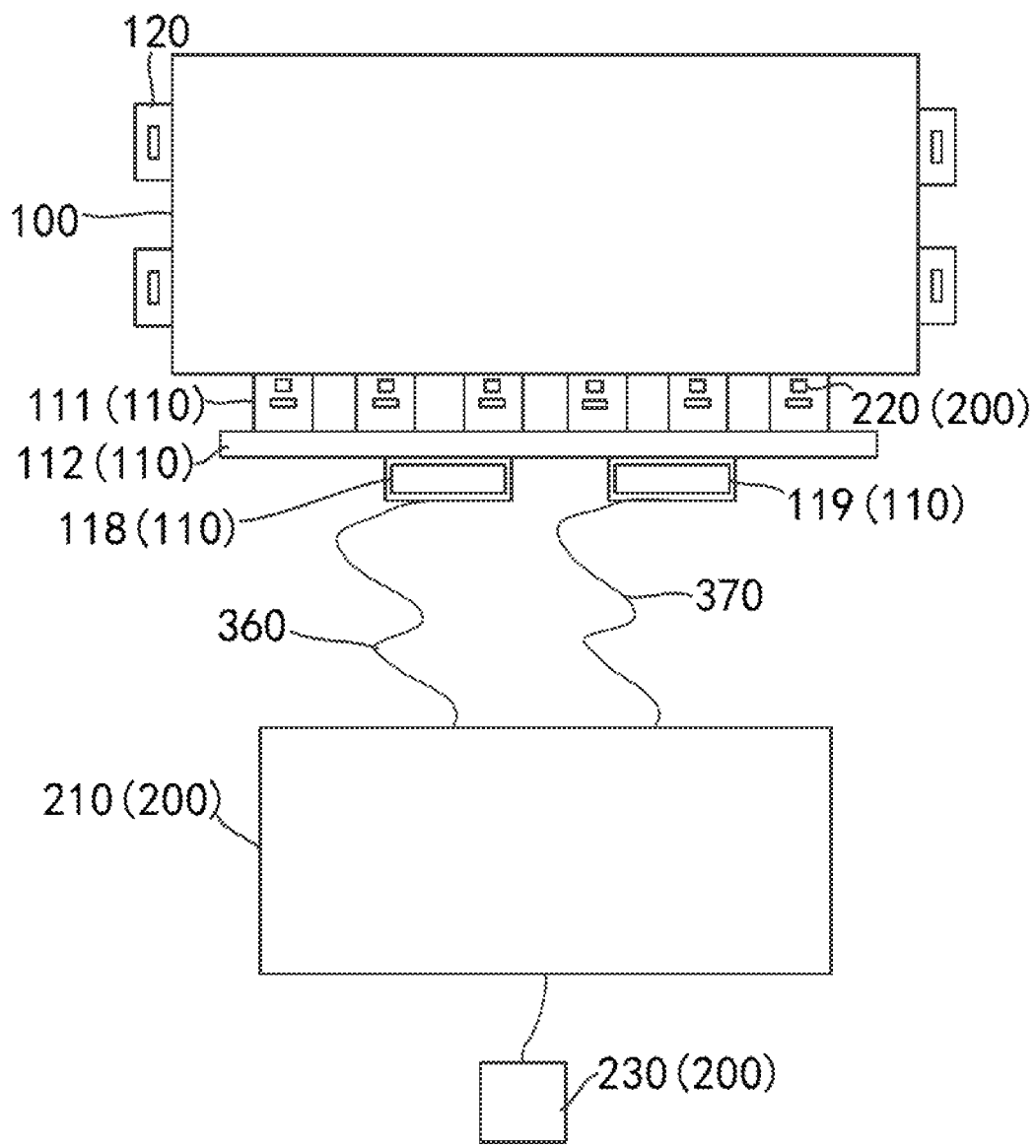
FIG. 8 is a structural schematic diagram of a detection apparatus for a display panel matching the display panel in an embodiment of the present application.

Example 1: as shown in FIG. 8, the clock signal generation circuit 230 is electrically connected to the power source board 210, and the power source board 210 is connected to a sixth connector 118 by a sixth connecting line 360 to transmit a power source signal; and the power source board 210 is connected to a seventh connector 119 by a seventh connecting line 370 to transmit a clock signal. The connecting strip 112 is electrically connected to the sixth connector 118 and the seventh connector 119 respectively, to transmit the power source signal and the clock signal to the source driver chip 111, so as to realize high temperature and high humidity detection.

Example 2: the power source board 210 is electrically connected to the clock signal generation circuit 230 directly, the clock signal generation circuit 230 is electrically connected to a connector, the connector is electrically connected to the connecting strip 112, and the connecting strip 112 is electrically connected to the source driver chip 111. In this way, the power source signal of the power source board 210 is transmitted to the source driver circuit board 110 by the clock signal generation circuit 230. The clock signal may be directly transmitted to the connector, and transmitted to the source drive chip 111 through the connecting strip 112.

The present embodiment has the advantages that a logic board or other detection circuit boards are omitted, and the logic board or the other detection circuit boards are prevented from being damaged, thereby not only saving costs, but also omitting a procedure, and improving the detection efficiency.

In the present application, the display panel 100 of the present application further includes a gate driver chip 120.

The display panel 100 of the present application may be, for example, an LCD panel, an OLED panel, a QLED panel, a curved surface type panel or other display panel.

The above contents are further detailed descriptions of the present application in combination with specific embodiments. However, the concrete implementation of the present application shall not be considered to be only limited to these descriptions. For those of ordinary skill in the art to which the present application belongs, several simple deductions or replacements may be made without departing from the conception of the present application, all of which shall be considered to belong to the protection scope of the present application.

What is claimed is:

1. A detection method of a display panel, the detection method comprising the following steps:
    storing a picture of detection in a source driver circuit board of a display panel;
    electrically connecting a power source board generating a power source signal directly to the source driver circuit board; and
    transmitting the power source signal and the clock signal the source driver circuit board; and
    wherein the clock signal is directly generated by the power source board, and the power source board is connected to a first connector of the source driver circuit board by a first connecting line, and the power source board is connected to a second connector of the source driver circuit board by a second connection line; the power source signal is transmitted to the first connector through the first connecting line, and the clock signal is transmitted to the second connector through the second connecting line; and a source driver chip of the source driver circuit board is connected to the first connector and the second connector respectively by a connecting strip.

2. The detection method of the display panel according to claim 1, wherein the clock signal is stored in the source driver chip of the source driver circuit board.

3. The detection method of the display panel according to claim 1, wherein the picture is stored in the source driver chip of the source driver circuit board.

4. The detection method of the display panel according to claim 1, wherein the clock signal is directly generated by the source driver chip of the source driver circuit board.

5. The detection method of the display panel according to claim 4, wherein the power source board is connected to a third connector of the source driver circuit board by a third connecting line, and the power source signal is transmitted to the third connector through the third connecting line; and the source driver chip is connected to the third connector by a connecting strip.

6. A detection apparatus of a display panel, comprising:
    a picture storage apparatus, adapted to store a picture of detection, and stored in the source driver circuit board of the display panel;
    a power source board, adapted to generate a power source signal, and electrical connected to the source driver circuit board directly; and
    a clock signal generation circuit, adapted to generate a clock signal, and electrically connected to the source driver circuit board; and wherein the clock signal generation circuit is disposed on the power source board, and the clock signal generation circuit comprises an oscillator, the oscillator is disposed on the power source board.

7. The detection apparatus of a display panel according to claim 6, wherein the power source board is connected to a first connector of a source driver circuit board by a first connecting line, and the power source board is connected to a second connector of the source driver circuit board by a second connecting line; the power source signal is transmitted to the first connector through the first connecting line, and the clock signal is transmitted to the second connector through the second connecting line; and the source driver chip of the source driver circuit board is connected to the first connector and the second connector respectively by a connecting strip.

8. The detection apparatus of a display panel according to claim 6, wherein the picture storage apparatus is disposed on a source driver circuit board of the display panel.

9. The detection apparatus of a display panel according to claim 6, wherein the power source board is electrically connected to the clock signal generation circuit, the clock signal generation circuit is electrically connected to a connector, the connector is electrically connected to a connector strip, and the connector strip is electrically connected to a source driver chip.

10. The detection apparatus of a display panel according to claim 6, wherein the clock signal generation circuit is electrically connected to the power source board, the power source board is connected through a sixth connection line and a sixth connector, the power source board is connected through a seventh connection line and a seventh connector, and connecting strips are electrically connected to the sixth connector and the seventh connector.

11. The detection apparatus of a display panel according to claim 6, wherein the clock signal generation circuit is generated on a source driver chip of the source driver circuit board.

12. The detection apparatus of a display panel according to claim 11, wherein the power source board is connected to a third connector of a source driver circuit board by a third connecting line, and the power source signal is transmitted to the third connector through the third connecting line; and the source driver chip is connected to the third connector by a connecting strip.

13. A detection apparatus of a display panel, comprising:
    a picture storage apparatus adapted to store a picture of detection and stored in a source driver chip of a source driver circuit board of the display panel;
    a power source board adapted to generate a power source signal and electrically connected to the source driver circuit board directly; and
    a clock signal generation circuit adapted to generate a clock signal, electrically connected to the source driver circuit board and disposed on the power source board, the power source board is connected to a first connector of the source driver circuit board by a first connecting line, and the power source board is connected to a second connector of the source driver circuit board by a second connecting line; the power source signal is transmitted to the first connector through the first connecting line, and the clock signal is transmitted to the second connector through the second connecting line; and the source driver chip of the source driver circuit board is connected to the first connector and the second connector respectively by a connecting strip.

\* \* \* \* \*